(12) United States Patent
Baer

(10) Patent No.: US 12,009,971 B2
(45) Date of Patent: Jun. 11, 2024

(54) CONNECTING DEVICE TO A MESH NETWORK

(71) Applicant: Telia Company AB, Solna (SE)

(72) Inventor: Anders Baer, Årsta (SE)

(73) Assignee: TELIA COMPANY AB, Solna (SE)

( * ) Notice: Subject to any disclaimer, the term of this patent is extended or adjusted under 35 U.S.C. 154(b) by 0 days.

(21) Appl. No.: 18/319,317

(22) Filed: May 17, 2023

(65) Prior Publication Data

US 2023/0379209 A1 Nov. 23, 2023

(30) Foreign Application Priority Data

May 18, 2022 (FI) ...................................... 20225435

(51) Int. Cl.
*H04L 41/0803* (2022.01)
*H04L 41/12* (2022.01)

(52) U.S. Cl.
CPC .......... *H04L 41/0803* (2013.01); *H04L 41/12* (2013.01)

(58) Field of Classification Search
CPC .................. H04L 41/0803–0897; H04L 41/12
See application file for complete search history.

(56) References Cited

U.S. PATENT DOCUMENTS

| | | | | |
|---|---|---|---|---|
| 7,630,326 B1 * | 12/2009 | Shear | ................. | H04L 41/0813 370/254 |
| 8,855,006 B2 * | 10/2014 | Gloss | .................... | H04L 47/782 370/254 |
| 10,636,030 B1 * | 4/2020 | Walters | ..................... | H04L 9/14 |
| 11,172,374 B1 * | 11/2021 | Ross | ..................... | H04L 67/104 |
| 11,200,329 B1 * | 12/2021 | Holsman | ............... | H04L 9/3247 |
| 11,563,636 B1 * | 1/2023 | Kairali | ................. | H04L 67/562 |
| 11,646,935 B1 * | 5/2023 | Khalid | ................. | H04L 45/586 709/226 |
| 11,762,844 B2 * | 9/2023 | White | ................ | G06F 16/2379 707/703 |
| 2002/0042274 A1 * | 4/2002 | Ades | ................... | H04L 41/0863 455/445 |
| 2016/0275461 A1 * | 9/2016 | Sprague | .............. | G06Q 20/386 |

(Continued)

FOREIGN PATENT DOCUMENTS

WO      2022006324 A1    1/2022
WO  WO-2022129998 A1 *   6/2022

OTHER PUBLICATIONS

Finland Search Report for FI20225435 dated Dec. 1, 2022, 1 page.
EP Search Report issued in EP Patent Application No. 23 17 3523 dated Sep. 21, 2023.

*Primary Examiner* — Alina A Boutah
(74) *Attorney, Agent, or Firm* — NIXON & VANDERHYE

(57) ABSTRACT

A method for arranging a device to operate in a mesh network is provided, the method includes: receiving data relating to the mesh network; evaluating at least one capability of the device to determine data indicative of at least one mesh network capability required by the device to operate in the mesh network; inquiring if the mesh network is capable of providing determined the at least one mesh network capability; and adjusting an application software executed by the device with data indicative of the at least one mesh network capability available from the mesh network for the device to connect the device to the mesh network. A device, a system, and a computer program are also provided.

25 Claims, 2 Drawing Sheets

(56) References Cited

U.S. PATENT DOCUMENTS

| | | | |
|---|---|---|---|
| 2017/0310590 A1* | 10/2017 | Diancin | H04L 45/745 |
| 2018/0234292 A1* | 8/2018 | Takazawa | G06F 3/1291 |
| 2019/0065544 A1 | 2/2019 | O'brien et al. | |
| 2020/0021485 A1* | 1/2020 | Pillai | G06F 11/1433 |
| 2021/0271461 A1 | 9/2021 | Aseev | |
| 2022/0012804 A1* | 1/2022 | Luo | G06F 21/6245 |
| 2022/0094560 A1 | 3/2022 | Gaur et al. | |
| 2022/0159761 A1* | 5/2022 | Ross | H04W 76/15 |
| 2022/0232082 A1* | 7/2022 | Iyer | H04L 67/104 |
| 2023/0209547 A1* | 6/2023 | Jonytis | H04L 67/12 |
| | | | 370/329 |

* cited by examiner

CONNECTING DEVICE TO A MESH NETWORK

CROSS-REFERENCE TO RELATED APPLICATIONS

This application claims the priority under 35 USC 119(a) of FI patent application 20225435 filed on 18 May 2022, the entirety of which is incorporated herein by reference.

TECHNICAL FIELD

The invention concerns in general the technical field of communication networks. More particularly, the invention concerns mesh networks.

BACKGROUND OF THE INVENTION

A mesh network is a communication network topology in which a number of so-called nodes connects directly, dynamically and non-hierarchically to other nodes to communicate efficiently with each other. Even if one advantage of the mesh networks is that they are self-organizable as such, an integration of a new device to the mesh network in question requires at least some efforts. The operation of the nodes, i.e. the devices, is also dependent on the circumstances and situation in the network and it may also happen that an operation of a node is to be adjusted in accordance with a requirements of the operation situation of the mesh network.

The above referred situation causes challenges in managing the mesh network due to tremendous increase of devices, such as IoT devices, which are connected to the mesh networks nowadays.

Hence, there is a need to develop solutions which at least in part alleviate a burden of connecting devices to mesh networks.

SUMMARY OF THE INVENTION

The following presents a simplified summary in order to provide basic understanding of some aspects of various invention embodiments. The summary is not an extensive overview of the invention. It is neither intended to identify key or critical elements of the invention nor to delineate the scope of the invention. The following summary merely presents some concepts of the invention in a simplified form as a prelude to a more detailed description of exemplifying embodiments of the invention.

An object of the invention is to present a method, a device, a system, and a computer program for arranging a device to operate in a mesh network.

The objects of the invention are reached by a method, a device, a system, and a computer program for arranging a device to operate in a mesh network as defined by the respective independent claims.

According to a first aspect, a method for arranging a device to operate in a mesh network is provided, the method, performed by the device, comprises:
  receiving data relating to the mesh network,
  evaluating at least one capability of the device to determine data indicative of at least one mesh network capability required by the device to operate in the mesh network,
  inquiring, from data storage connected to the mesh network, if the mesh network is capable of providing determined the at least one mesh network capability the device requires, and
  adjusting, in response to a receipt of a response to the inquiring that the mesh network is capable of providing determined the at least one mesh network capability the device requires, an application software executed by the device with data indicative of the at least one mesh network capability available from the mesh network for the device to connect the device to the mesh network.

For example, the data may be received from at least one of the following: a memory of the device; a data storage; a device belonging to the mesh network.

The method may further comprise:
  allocating a portion of at least one capability of the device available for the mesh network in accordance with the data relating to the mesh network.

The allocating of the portion of the at least one capability of the device may comprise:
  determining an amount of at least one resource of the device available to the mesh network, and
  reserving the determined amount of at least one resource of the device for the mesh network.

Still further, the adjusting of the application software executed by the device with the data indicative of the at least one mesh network capability available from the mesh network for the device may be performed together with the data representing the portion of the at least one capability allocated by the device for the mesh network.

In response to the allocating of the portion of the at least one capability of the device data indicative of the portion of the at least one capability of the device may be stored in a data storage. The data may be stored in a block-chain database maintained in the data storage.

Still further, a determination of the at least one mesh network capability required by the device may be performed by evaluating at least one capability of the user device with respect to at least one requirement of the mesh network indicated in the data relating to the mesh network. For example, the evaluating may comprise a detection if the device lacks at least one capability required by the mesh network.

A network address of the data storage for the inquiring may be received in the data relating to the mesh network.

Still further, at least the steps of evaluating, inquiring, and adjusting may be re-performed in response to at least one of the following: a detection that a setup of the mesh network changes; a detection that the availability of the at least one capability of the device changes; a detection that the at least one mesh network capability required by the device changes; a detection of a lapse of a predefined period of time.

According to a second aspect, a device for arranging the device to operate in a mesh network is provided, the device is configured to:
  receive data comprising data relating to the mesh network,
  evaluate at least one capability of the device to determine data indicative of at least one mesh network capability required by the device to operate in the mesh network,
  inquire, from data storage connected to the mesh network, if the mesh network is capable of providing determined the at least one mesh network capability the device requires, and
  adjust, in response to a receipt of a response to the inquiring that the mesh network is capable of providing determined the at least one mesh network capability the device requires, an application software executed by the device with data indicative of the at least one mesh network capability available from the mesh network for the device to connect the device to the mesh network.

The device may be configured to receive the data from at least one of the following: a memory of the device; a data storage; a device belonging to the mesh network.

The device may further be configured to:

allocate a portion of at least one capability of the device available for the mesh network in accordance with the data relating to the mesh network. The device may be configured to perform the allocating of the portion of the at least one capability of the device by:

determining an amount of at least one resource of the device available to the mesh network, and reserving the determined amount of at least one resource of the device for the mesh network.

The device may be configured to perform the adjusting of the application software executed by the device with the data indicative of the at least one mesh network capability available from the mesh network for the device together with the data representing the portion of the at least one capability allocated by the device for the mesh network.

Moreover, the device may be configured to, in response to the allocating of the portion of the at least one capability of the device, store data indicative of the portion of the at least one capability of the device in a data storage. The device may be configured to store the data in a blockchain database maintained in the data storage.

The device may be configured to perform a determination of the at least one mesh network capability required by the device by evaluating at least one capability of the user device with respect to at least one requirement of the mesh network indicated in the data relating to the mesh network. For example, the device may be configured to perform the evaluating by detecting if the device lacks at least one capability required by the mesh network.

The device may also be configured to receive a network address of the data storage for the inquiring (240) in the data relating to the mesh network.

The device may be configured to re-perform at least the steps of evaluating, inquiring, and adjusting in response to at least one of the following: a detection that a setup of the mesh network changes; a detection that the availability of the at least one capability of the device changes; a detection that the at least one mesh network capability required by the device changes; a detection of a lapse of a predefined period of time.

According to a third aspect, a system is provided, the system comprising:

a number of devices communicatively connected to form a mesh network, a data storage, and a device according to the second aspect as defined above.

The data storage may be configured to store data in a blockchain database.

According to a fourth aspect, a computer program is provided, the computer program comprising a computer readable program code configured to cause performing of the method according to the first aspect as defined above when the computer readable program code is run on one or more computing apparatuses.

The expression "a number of" refers herein to any positive integer starting from one, e.g. to one, two, or three.

The expression "a plurality of" refers herein to any positive integer starting from two, e.g. to two, three, or four.

Various exemplifying and non-limiting embodiments of the invention both as to constructions and to methods of operation, together with additional objects and advantages thereof, will be best understood from the following description of specific exemplifying and non-limiting embodiments when read in connection with the accompanying drawings.

The verbs "to comprise" and "to include" are used in this document as open limitations that neither exclude nor require the existence of unrecited features. The features recited in dependent claims are mutually freely combinable unless otherwise explicitly stated. Furthermore, it is to be understood that the use of "a" or "an", i.e. a singular form, throughout this document does not exclude a plurality.

BRIEF DESCRIPTION OF THE DRAWINGS

The embodiments of the invention are illustrated by way of example, and not by way of limitation, in the figures of the accompanying drawings.

DETAILED DESCRIPTION

The specific examples provided in the description given below should not be construed as limiting the scope and/or the applicability of the appended claims. Lists and groups of examples provided in the description given below are not exhaustive unless otherwise explicitly stated.

Figure 1:
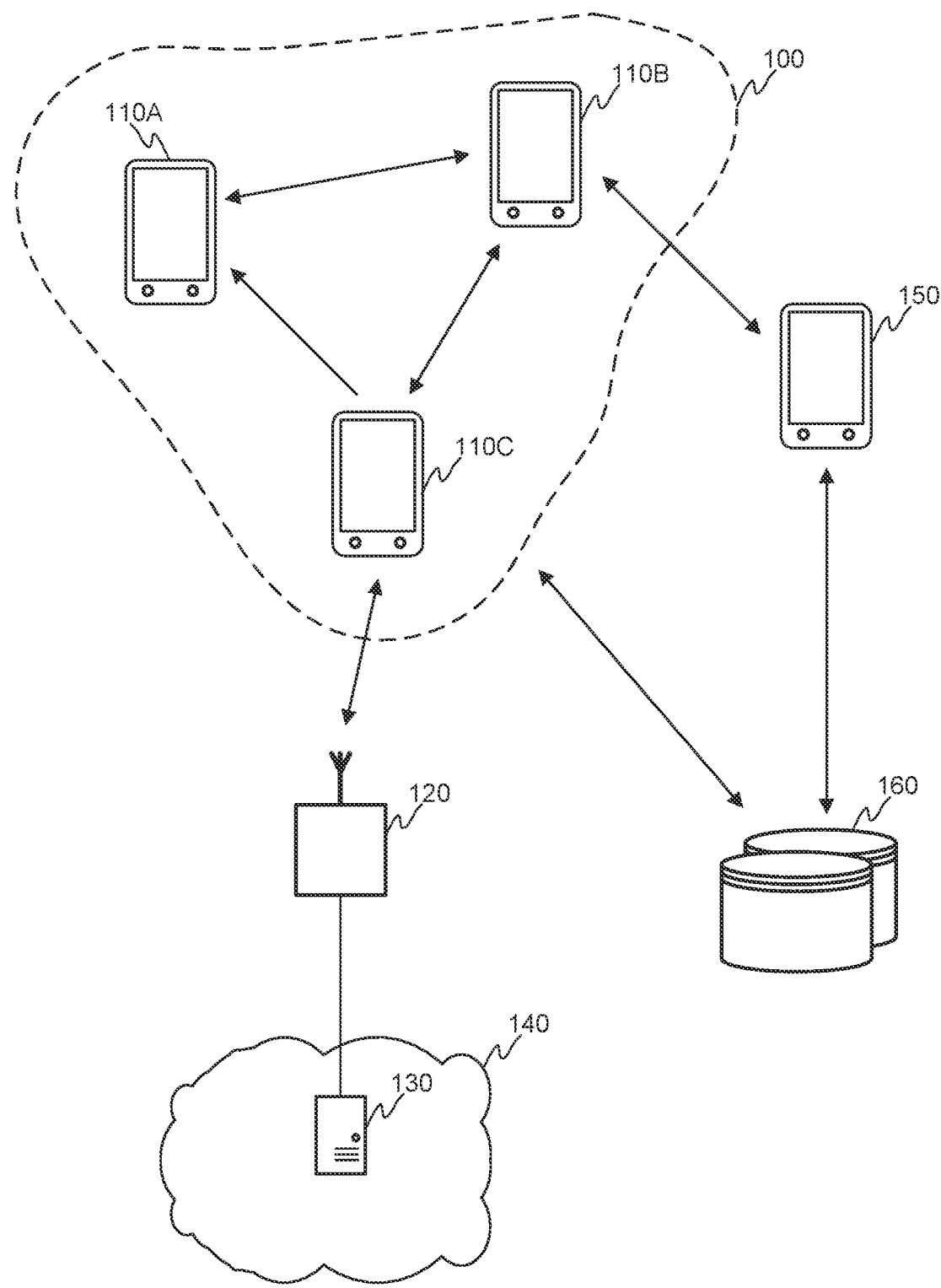
FIG. 1 illustrates schematically a communication environment according to an example.

FIG. 1 illustrates schematically an example of a communication environment into which the present invention may be implemented to. A mesh network 100 is set operative between devices 110A, 110B, 110C. In the non-limiting example embodiment as schematically illustrated in FIG. 1 the device 110C is configured to operate as a relay device for communicating e.g. with a server device 130 residing in a data network 140, such as Internet. For example, the relay device may be provided an access to a wireless local area network, such as Wi-Fi, through a base station 120, which base station 120 is then communicatively connected to the server device 130 in the data network 140 through one or more network entities, such as routers, switches, and similar. For example, the server device 130 may be configured to manage a service into which the devices 110A, 110B, 110C are involved to, e.g. as devices providing information related to the location the devices reside. For sake of clarity it is worthwhile to mention that the entity referred with 100 in FIG. 1, i.e. the mesh network, is not any physical entity as such but is referred in order to provide a way to describe at least some aspects of the present invention.

Now, a device referred with 150 in FIG. 1 is to be added to the mesh network 100. The device 150 is communicatively equipped to be involved in the mesh network 100 in accordance with the present invention. The device 150 is also communicatively connected to data storage 160 for delivering data in a manner as is described in the forthcoming description. In accordance with some example embodiments the data storage 160 may be configured to, in addition to store data, to maintain a blockchain ledger descriptive of one or more capabilities and events of the mesh network 100. Hence, the data storage 160 may also be configured to be accessed by the other devices 110A-110C belonging to the mesh network 100. For sake of completeness the access to the data storage 160 may be implemented directly from all the devices belonging to the mesh network 100 or by defining at least one device of the mesh network 100 to operate as a relay device towards the data storage 160 correspondingly to the device 110C towards the base station 120 and the service device 130 in the data network 140. In may also be arranged that the data storage 160 is accessible, at least for the devices 110A-110C of the mesh network 100, through the base station 120 and the data network 140, or that the data storage 160 resides in the data network 140. Still further, the data storage 160 for the device 150 may be different than the one for the mesh network 100, i.e. the devices 110A-110C belonging to the mesh network 100.

The devices 120A, 1208, 120C, 150 of the mesh network 100 may be any devices having a communication capabilities to operate in the mesh network 100 and in a manner as is described in the forthcoming description. For example, they may be user devices, such as mobile phones, laptops, or tablet computers, or they may be industrial devices, such as sensor devices, control devices, or any similar, or any suitable devices in general.

Figure 2:
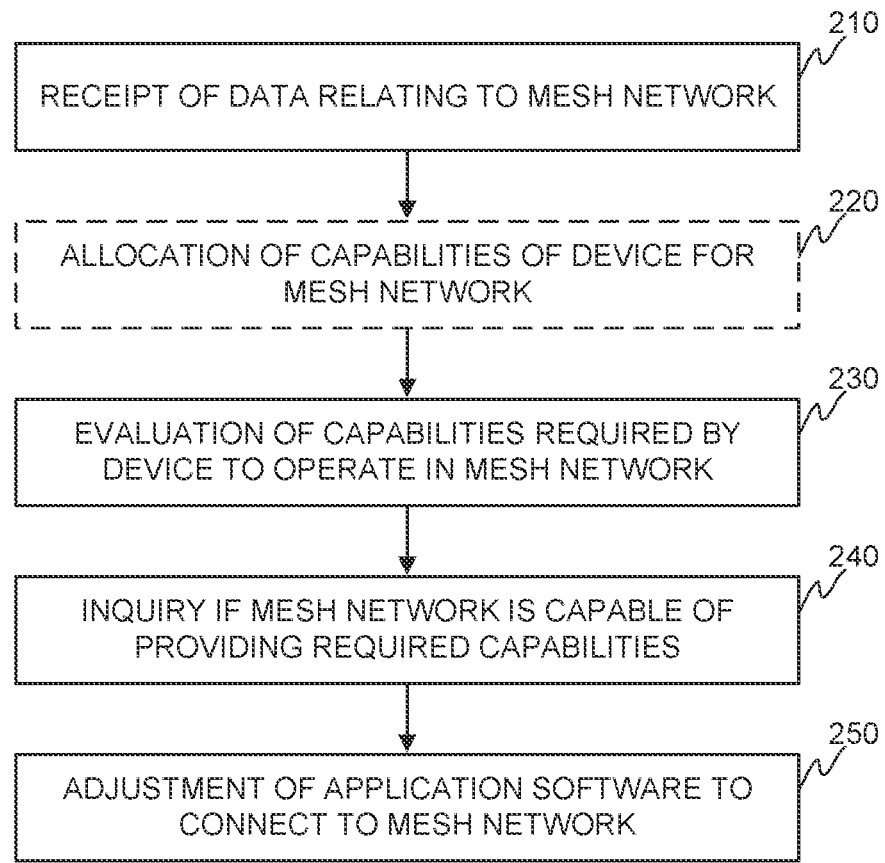
FIG. 2 illustrates schematically a method according to an example.

Next, at least some further aspects of the present invention are described by referring to FIG. 2 schematically illustrating a flow chart of a method according to an example. As said, the device 150 aims to connect to the mesh network 100 already consisting of devices 110A, 110B, 110C. In order to do that the device 150 may be configured to request accessing to the mesh network 100 by receiving 210 data relating to the mesh network 100. According to first embodiment, the device 150 in question may store data relating to the mesh network 100 in question. It may acquire the data from a memory in a predefined manner, such as based on a predefined identifier, which identifier may be based on a location of the mesh network 100, and, thus, the device 150, or to a mesh network identifier obtained in any manner. According to a second embodiment, the device 150 may receive 210 data by communicating with another entity, which may e.g. be one of the devices 110A-110C belonging to the mesh network 100 or the base station 120 e.g. providing the wireless local area network thereto, or any other entity. For example, the device 150 may be configured to listen certain radio interface in order to discover the other devices 110A-110C, and to exchange data, such as a token used for accessing the mesh network 100 with other information of the mesh network 100. For example, this kind of approach may be implemented, according to an embodiment, so that a number of devices 110A-110C, e.g. one or more, belonging to the mesh network 100 is configured to broadcast over a predefined protocol, such as via a device capability protocol (DCP), that the device 110A-110C in question is configured to operate as an anchor point for attaching to the mesh network 100. The device 150 willing to attach to that mesh network 100 may then be configured to perform an authentication procedure comprising e.g. a signing in and authentication to the mesh network 100 in question. In response to such a successful procedure the device 150 may receive 210 the data relating to the mesh network 100 and start utilizing capabilities belonging to the mesh network 100 as is described in the forthcoming description. For example, according to an embodiment the device 150 may be configured to request, and thus receive 210, data relating to the mesh network 100 from the data storage 160. The network address of the data storage 160 may be stored in the memory of the device 150 and obtained therefrom in a context of requesting accessing, or associating to, the mesh network 100. The requesting to access the mesh network 100 may be implemented so that the device 150 is provided with an application software which is used in relation to an operation in the mesh networks 100, and also for accessing the mesh networks 100. In some example embodiment the device 150 may receive the data relating to the mesh network 100 automatically e.g. through the application executed by the device 150 triggered e.g. by a location of the device 150, or by any other criteria.

Hence, the device 150 is configured to receive 210 data relating to the mesh network 100 into which the device 150 intends to connect to. The received data may define the operation of the mesh network 100 to an extent that the device 150 may perform resource related evaluation of its capabilities as described in the forthcoming description.

In accordance with some example embodiments the device 150 may be configured to, in response to the receipt 210 of the data from at least one device 110A-110C belonging to mesh network 100 or from data storage or similar, allocate 220 a portion of its one or more capabilities, i.e. a resource of some type, available for the mesh network 100 in accordance with the data relating to the mesh network 100. In other words, the device 150 may be configured to evaluate its resources in view of the data relating to the mesh network 100, and allocate, if possible, its resources at least in part to be available for utilizing by the mesh network 100 in its operation. The resources providable to be utilized in the mesh network 100 may e.g. relate to computing capability (e.g. a certain amount of processor resources allowed to be used for the operation in the mesh network 100), to memory capability (e.g. a certain amount of memory allowed to be used for the operation in the mesh network 100), and so on. Correspondingly, the allocation of the capabilities may relate to power consumption aspects, communication related parameters (e.g. bandwidth), or any similar. The allocation of the capabilities of the device 150 shall be understood to relate to a determination on an amount of resources the device (150) may provide to the mesh network 100, i.e. the other devices 110A-110C in the mesh network 100. This also means that how much resources is left for internal operation of the device 150. For example, the determination may comprise a procedure in which it is determined how much another device may e.g. store data to the memory of the device 150 if such an allocation is made. The allocation of the capabilities may be made in a static or in a dynamic basis. In the latter case, the evaluation may e.g. be made at predefined intervals in time or made dependent on a change in a location of the device 150 so as to optimize the sharing of resources in an optimal manner from the device 150 point of view. Besides, the setup of the mesh network 100 may change due to changes in other devices 110A-110C in the mesh network 100. In response to the determination the determined amount of resource, or a plurality of them, may be reserved from the mesh network 100 which may e.g. correspond to that the determined resource is not allowed to be access by the internal operations of the device 150 anymore and until a release of the resource. The exchange of the data used for dynamic allocation of capabilities may be implemented by applying the DCP protocol, as referred to in the foregoing description, which may e.g. be configured to be applied by the application software executed in the method for arranging to operate in the mesh network as is described herein.

In accordance with some example embodiments the method may comprise a step in which information, i.e. data indicative of the allocated portion of the capabilities is stored in the data storage 160, such as in the blockchain, so that the data may be set accessible to other entities and with the blockchain it is possible to confirm an authenticity of the information defined by the data.

In accordance with the present invention the device 150, in order to operate in the mesh network 100, is configured to evaluate 230 at least one capability of the device 150 to determine and generate data which is indictive of at least one capability of the mesh network 100 that is required by the device 150 in order to operate in the mesh network 100 in question. The evaluation may be performed either directly in response to the receipt 210 of data relating to the mesh network or in response to that the device 150 has allocated 220 its resources to the mesh network wherein the latter is performed in embodiments in which the step 220 is implemented to. The evaluation 230 may be based on data relating to the mesh network 100 received in the step 210 or inquired later on e.g. from the data storage 160. The data may e.g. define the resources mandatorily required from the device 150, but also define resources which may be provided either by the device 150 or by the mesh network 100, or only by the mesh network 100. Hence, the device 150 may be configured to use the data for evaluating at least one capability of the device 150 to determine data indicative of at least one mesh network 100 capability required by the device 150 to operate in the mesh network. For example, it may be defined that a portion of a computing resource for operating in the mesh network 100 may be obtained either from the device 150 or from the mesh network 100, i.e. from at least one other device 110A-110C of the mesh network 100. The device 150 may perform the evaluation on its own capability and end up to a conclusion that a certain resource is needed, at least in part, from the mesh network 100 side. Hence, the device 150 is configured to determine data indicative of at least one mesh network capability, which in the case of the present example is the portion of the computing resource, that is required by the device 150 to operate in the mesh network 100.

In response to the evaluation 230, and the generation of the data as described, the device 150 may be configured to inquire 240, from data storage 160 connected to the mesh network 100 if the mesh network 100 is capable of providing determined at least one mesh network capability the device 150 requires. In other words, the data storage 160 may be configured to maintain data indicative of the capabilities the devices 110A-110C belonging to the mesh network 100 may provide to others, such as to new devices 150 accessing the mesh network 100 in question. A network address of the data storage 160 towards which the inquiry is performed may be received with the data relating to the mesh network 100 received in the step 210 as described in the foregoing description, or it may e.g. be stored in a memory of the device 150 wherefrom it may be obtained for performing the inquiry 240.

In accordance with some example embodiments the data storage 160 may refer to an implementation which is based on a blockchain technology. For example, the devices 110A-110C belonging to the mesh network 100 may store data to the blockchain wherein the stored data may represent their capability situation, such as data indicative of the capabilities they may provide for common use, such as to the device 150, in the mesh network 100. The storing of the data representing the capability situation of the devices 110A-110C may be stored on a device-by-device basis and regularly under a predefined scheme or dynamically e.g. when the status quo changes. The data stored in the blockchain may be managed by means of the blockchain ledger as is known from the blockchain technology as such. For example, it is possible to store in the blockchain ledger data which indicates the devices that have been a part of a mesh network with any time related information as well data descriptive of the operation of the devices in the mesh network, such as what and when a device contributed with in the mesh network. Thus, the blockchain ledger provides a tool for security related aspects, such as authentication of the data blocks stored in the blockchain database. Thus, the blockchain database may respond to the inquiry of the device 150 with reliable data.

Finally, the device 150 may receive a response to the inquiry 240 and in case the response comprises data that the mesh network 100, i.e. at least one of the devices 110A-110C forming the mesh network 100, is capable of providing the at least one mesh network capability the device 150 requires, the device 150 may be configured to adjust 250 an application software executed by the device 150 with the data indicative of the at least one mesh network capability available from the mesh network 100 for the device 150 to connect the device 150 to the mesh network 100. The application software is at least configured to execute one or more functions to enable the device 150 in question to operate in the mesh network 100, and, hence, the application software executed by the device 150 is adjusted 250 with the data obtained during the method. In embodiments wherein the device 150 has also allocated at least a portion of its capability, or capabilities, available for the mesh network 100 the adjustment 250 of the application software may also take into account the allocation of the resources by the device 150. Generally speaking, the adjustment of the application software may e.g. comprise a setting of parameters at least in accordance with the capability allocation, as well as the capability allocation of the device 150 in those embodiments, as defined in the previous steps of the method. In response to the setting of the parameters accordingly the execution of the application software causes the device 150 to operate in accordance with the parameters in the mesh network 100. Thus, the device 150 may be connected to the mesh network 100. The connecting may require further communication with at least one other entity, such as with one of the devices 110A-110C already in the mesh network 100, e.g. for informing that the device 150 is ready for associating to the mesh network 100, and as a result an acknowledgement to associate may be provided to the device 150. The device 110A-110C in the mesh network with whom the communication is performed may e.g. be a device 110A-110C to which it is assigned any association related tasks with respect to the mesh network 100. The device 150 may e.g. receive information on the device 110A-110C, such as its network address, in the received data relating to the mesh network 100 in the step 210. The device 110A-110C of the mesh network 100 suitable to perform the association related tasks may be a so-called router device of the mesh network 100, or at least one device possibly operating as a master device compared to other devices of the mesh network 100. Additionally, the device 150 when connected to the mesh network 100 may be requested to stored data descriptive on its operation and capabilities, as well as allocated capabilities, in the data storage 160.

In accordance with some example embodiments the adjustment of the application software may be set temporally, and the adjustment may be renewed in response to a fulfillment of certain conditions. For example, it may be arranged that the method, and at least the steps of allocating 220, evaluating 230, inquiring 240, and adjusting 250 are re-performed in response to a detection of the fulfillment of one or more conditions. At least one condition whose fulfillment may be monitored may be that the setup of the mesh network 100 remains the same as when the device 150 associated to the mesh network 100. In other words, if the setup changes in any manner, such as that one or more of the other devices 110A-110C disassociates, i.e. leaves, the mesh network 100, one or more new devices associates to the mesh network 100, capabilities of the other devices 110A-110C available for the device 150 change, the device 150 may need to evaluate its capability to stay in the mesh network 100. It may be done by performing the method as shown in FIG. 2 again, and at least the step 230 and 240 in order to guarantee that the mesh network 100 may still provide the capabilities required by the device 150 to operate in the mesh network 100. For example, it may be arranged so that the mesh network 100, such as the master device of it or any other device provided with an access, may be configured to update the data stored in the data storage 160 which is then used by the device 150 in the step 240 when performing the inquiry. In some example embodiments the condition may be set in a time based manner, i.e. the evaluation 230 of the required capabilities and the inquiry 240 is performed again after a predefined period of time has elapsed.

In accordance with some further example embodiments the allocation 220 of the portion of the capabilities, i.e. an amount of resources, of the device 150, and especially of a usage of the allocated resources, may be monitored on a device basis. For example, the application software may be, upon setting the allocated resources as a parameter for its operation, configured to execute a portion of a software causing a monitoring of the usage of the allocated resources by the mesh network 100, i.e. the other devices 110A-110C of the mesh network 100, and if the device 150 may maintain the at least one resource available. This may be implemented by measuring a usage of a respective entity, or entities, whose resources are allocated to the mesh network 100 in an appropriate manner. For example, the usage of the memory of the device 150 may be monitored by determining a total amount of processes in relation to the memory and to subtract the amount of processes in relation to the memory originating from internal applications, or similar, of the device 150. Correspondingly, the usage of the computing resources by the mesh network 100, or any other entity of the device 150 whose capabilities are at least in part allocated to the mesh network 100, may be determined in a respective manner. The measured value may be evaluated in the device 150 and if it e.g. indicates that the allocated capability is not used by the other devices 110A-110C belonging to the mesh network 100, or is used, e.g. on average, less that allocated thereto, the device 150 may be configured to re-evaluate the portion of the capability, or capabilities, to be allocated to the mesh network 100. Respectively, if the measured value indicates that the resource, or resources, is continuously used at its maximum level, the re-evaluation may also be performed, e.g. so as to determine if the device 150 may allocate more of the resource, or resources, in question to the mesh network 100. In other words, this kind of monitoring may cause triggering of the performing of the method as described. According to a still further embodiment, the method, or at least the steps 220-250 of FIG. 2, may be set to be re-performed upon a lapse of a predefined period of time monitored with an applicable counter, such as with a preconfigured clock.

Still further, in accordance with some example embodiments the device 150 may be configured to subscribe additional resources from the mesh network 100. The additional resources may refer to that the device 150 is willing to have more resources of the same type already used from the mesh network 100, i.e. from at least one of the devices 110A-110C in the mesh network 100, or to that the device is willing to have another resource, or resources, in order to operate in the mesh network 100. The device 150 in question may be configured to advertise the requirement of the additional resources at any time of the communication with the mesh network 100 and the devices 110A-110C may continuously evaluate their position to grant the required additional resource at any time. In response to a situation that such a possibility arises the device 110A-110C in question may respond to the device 150, or store indication in the data storage 160, so as to inform the device 150 that the required additional resource may be provided. Vice versa, in case a device 110A-110C of the mesh network 100 providing required resource to the device 150 detects that it cannot continue providing the resource to the device 150 it may be configured to inform this to the device 150 so as to request the device 150 to prepare a situation that the provision of the resource is canceled. This may e.g. cause the device 150 to re-advertise its need of the same resource from another device 110A-110C.

Figure 3:
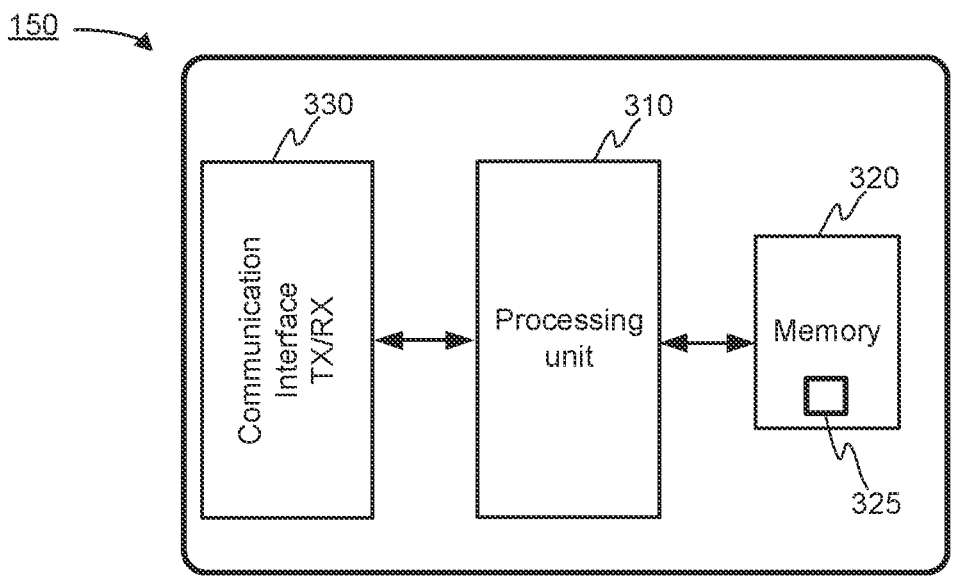
FIG. 3 illustrates schematically an apparatus according to an example.

An example of an apparatus suitable for performing a method according to an example embodiment of the invention as the device 150 is schematically illustrated in FIG. 3 as a block diagram. The apparatus may be configured to implement at least part of the method for arranging the device 150 to operate in the mesh network 100. The execution of the method, or at least some portions of it, may be achieved by arranging a processing unit 310 comprising at least one processor to execute at least some portion of computer program code 325 stored in at least one memory 320 causing the processor 310, and, thus, the apparatus to implement the method steps as described. In other words, the processing unit 310 may be arranged to access the memory 320 and to retrieve and to store any information therefrom and thereto. Moreover, the processing unit 310 may be configured to control a communication through one or more communication interfaces 330 for accessing the other entities being involved in the operation, such as the data storage 160 and the other devices 110A-110C of the mesh network 100 in a manner as described in the foregoing description. Hence, the communication interface 330 may be arranged to implement, possibly under control of the processing unit 310, a number of communication protocols, such as an IP or any other communication protocol, for communicating with one or more entities to receive input and to output data as described. The term communication interface 330 shall be understood in a broad manner comprising necessary hardware and software elements for implementing the communication techniques. Further, the apparatus in question may comprise one or more input/output devices for inputting and outputting information. In accordance with the present invention such input/output devices forming a user interface may at least comprise a touch screen, but may also comprise further entities, such as a physical keyboard, buttons, display, loudspeaker, microphone camera and so on. In some implementation of the apparatus at least some of the input/output devices may be external to the apparatus and coupled to it either wirelessly or in a wired manner. For sake of clarity, the processing unit 310 herein refers to any unit or a plurality of units suitable for processing information and control the operation of the apparatus in general at least in part, among other tasks. The mentioned operations may e.g. be implemented with a microcontroller solution with embedded software. Similarly, the invention is not limited to a certain type of memory 320, but any memory unit or a plurality of memory units suitable for storing the described pieces of information, such as portions of computer program code and/or parameters, may be applied in the context of the present invention. Moreover, at least the mentioned entities may be arranged to be at least communicatively coupled to each other with an internal data connection, such as with a data bus. Still further, the device 150 may comprise further units, such as sensors and similar e.g. in a case that the device 150 is operative to generate data representing conditions in its location when operating in the mesh network 100.

In some examples, the apparatus, i.e. the device 150, may be implemented with a distributed computing environment in which a plurality of computing devices is configured to cooperate to cause an execution of the method according to at least one of the examples as described. A non-limiting example of such a distributed computing system may be that a first device 150 is configured to allocate the portion of the capabilities available for the mesh network 100, and a second device 150, in turn, may be configured to perform the steps needed to adjust the operation so as to utilize the capabilities of the mesh network 100.

As derivable from above, some aspects of the present invention may relate to a computer program product which, when executed by at least one processor, cause an apparatus as the device 150 to perform at least some portions of the method as described. For example, the computer program product may comprise at least one computer-readable non-transitory medium having the computer program code 325 stored thereon. The computer-readable non-transitory medium may comprise a memory device or a record medium such as a CD-ROM, a DVD, a Blu-ray disc, or another article of manufacture that tangibly embodies the computer program. As another example, the computer program may be provided as a signal configured to reliably transfer the computer program.

Still further, the computer program code 325 may comprise a proprietary ap-plication, such as computer program code for generating the data record in the manner as described.

The computer program code 325 may also be considered to include the definitions and instructions of an execution of the application of the data record in a further use.

Some aspects of the present invention relate to a system as derivable from the foregoing description. Hence, the system comprises a number of devices 110A, 110B, 110C communicatively connected to at least one other device 110A, 110B, 110C to form a mesh network 100, a data storage 160, and a device 150 as described above. For example, the data storage 160 may be configured to store data in a blockchain database.

The specific examples provided in the description given above should not be construed as limiting the applicability and/or the interpretation of the appended claims. Lists and groups of examples provided in the description given above are not exhaustive unless otherwise explicitly stated.

What is claimed is:

1. A method for arranging a device to operate in a mesh network, the method, performed by the device, comprising:
    receiving data relating to the mesh network;
    evaluating at least one capability of the device to determine data indicative of at least one mesh network capability required by the device to operate in the mesh network;
    inquiring, from a data storage connected to the mesh network, that the mesh network is configured to provide the at least one mesh network capability that is required by the device; and
    adjusting, in response to a receipt of a response to the inquiring that the mesh network is configured to provide the at least one mesh network capability that is required by the device, an application software executed by the device with the data indicative of the at least one mesh network capability available from the mesh network for the device to connect the device to the mesh network.

2. The method according to claim 1, wherein the data is received from at least one of the following: a memory of the device, a data storage, and a device belonging to the mesh network.

3. The method according to claim 1, further comprising:
    allocating a portion of at least one capability of the device available for the mesh network in accordance with the data relating to the mesh network.

4. The method according to claim 3, wherein the allocating the portion of the at least one capability of the device comprises:
    determining an amount of at least one resource of the device available to the mesh network, and
    reserving the determined amount of at least one resource of the device for the mesh network.

5. The method according to claim 3, wherein the adjusting the application software executed by the device with the data indicative of the at least one mesh network capability available from the mesh network for the device is performed together with the data representing the portion of the at least one capability allocated by the device for the mesh network.

6. The method according to claim 3, wherein, in response to the allocating the portion of the at least one capability of the device, data indicative of the portion of the at least one capability of the device is stored in a data storage.

7. The method according to claim 6, wherein the data is stored in a blockchain database maintained in the data storage.

8. The method according to claim 1, wherein a determination of the at least one mesh network capability required by the device is performed by evaluating at least one capability of the user device with respect to at least one requirement of the mesh network indicated in the data relating to the mesh network.

9. The method according to claim 8, wherein the evaluating comprises detecting when the device lacks at least one capability required by the mesh network.

10. The method according to claim 1, wherein a network address of the data storage for the inquiring is received in the data relating to the mesh network.

11. The method according to claim 1, wherein at least the evaluating, the inquiring, and the adjusting are re-performed in response to at least one of the following: a detection that a setup of the mesh network changes, a detection that the availability of the at least one capability of the device changes, a detection that the at least one mesh network capability required by the device changes, and a detection of a lapse of a predefined period of time.

12. A non-transitory computer-readable medium on which is stored a computer program comprising a computer-readable program code configured to cause performing of the method according to claim 1 when the computer readable program code is run on one or more computing apparatuses.

13. A device configured to arrange the device to operate in a mesh network, the device comprising:
    at least one processor configured to:
        receive data comprising data relating to the mesh network,
        evaluate at least one capability of the operation device to determine data indicative of at least one mesh network capability required by the device to operate in the mesh network, inquire, from a data storage connected to the mesh network, that the mesh network is configured to provide the at least one mesh network capability that is required by the device, and adjust, in response to a receipt of a response to the inquiring that the mesh network is configured to provide the at least one mesh network capability that is required by the device, an application software executed by the device with the data indicative of the at least one mesh network capability available from the mesh network for the device to connect the device to the mesh network.

14. The device according to claim 13, wherein the device is configured to receive the data from at least one of the following: a memory of the device, a data storage, and a mesh network device belonging to the mesh network.

15. The device according to claim 13, wherein at least one processor of the device is further configured to:

allocate a portion of at least one capability of the device available for the mesh network in accordance with the data relating to the mesh network.

16. The device according to claim 15, wherein the at least one processor of the device is configured to perform the allocating the portion of the at least one capability of the device by:

determining an amount of at least one resource of the device available to the mesh network, and reserving the determined amount of at least one resource of the device for the mesh network.

17. The device according to claim 15, wherein the at least one processor of the device is configured to perform the adjusting the application software executed by the device with the data indicative of the at least one mesh network capability available from the mesh network for the device together with the data representing the portion of the at least one capability allocated by the device for the mesh network.

18. The device according to claim 15, wherein the at least one processor of the device is configured to, in response to the allocating the portion of the at least one capability of the device, store data indicative of the portion of the at least one capability of the device in a data storage.

19. The device according to claim 18, wherein the at least one processor of the device is configured to store the data in a blockchain database maintained in the data storage.

20. The device according to claim 13, wherein the at least one processor of the device is configured to perform a determination of the at least one mesh network capability required by the device by evaluating at least one capability of the user device with respect to at least one requirement of the mesh network indicated in the data relating to the mesh network.

21. The device according to claim 20, wherein the at least one processor of the device is configured to perform the evaluating by detecting when the device lacks at least one capability required by the mesh network.

22. The device according to claim 13, wherein the at least one processor of the device is configured to receive a network address of the data storage for the inquiring in the data relating to the mesh network.

23. The device according to claim 13, wherein the at least one processor of the device is configured to re-perform at least the evaluating, the inquiring, and the adjusting in response to at least one of the following: a detection that a setup of the mesh network changes, a detection that the availability of the at least one capability of the device changes, a detection that the at least one mesh network capability required by the device changes, and a detection of a lapse of a predefined period of time.

24. A system comprising:

a plurality of mesh network devices communicatively connected to form a mesh network;

a data storage; and the device according to claim 13.

25. The system according to claim 24, wherein the data storage is configured to store data in a blockchain database.

* * * * *